(12) United States Patent
Maezawa et al.

(10) Patent No.: US 9,222,009 B2
(45) Date of Patent: Dec. 29, 2015

(54) FINE ABRASIVE PARTICLES AND METHOD FOR PRODUCING SAME

(75) Inventors: Akihiro Maezawa, Hino (JP); Atsushi Takahashi, Hachioji (JP); Yuuki Nagai, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/981,857

(22) PCT Filed: Oct. 7, 2011

(86) PCT No.: PCT/JP2011/073194
§ 371 (c)(1),
(2), (4) Date: Jul. 25, 2013

(87) PCT Pub. No.: WO2012/101871
PCT Pub. Date: Aug. 2, 2012

(65) Prior Publication Data
US 2013/0305618 A1    Nov. 21, 2013

(30) Foreign Application Priority Data

Jan. 25, 2011   (JP) ................ 2011-012695

(51) Int. Cl.
*C09K 3/14* (2006.01)
(52) U.S. Cl.
CPC .................... *C09K 3/1409* (2013.01)
(58) Field of Classification Search
CPC .................... C09G 1/02; C09K 3/14
USPC ........................................ 51/307
See application file for complete search history.

(56) References Cited

U.S. PATENT DOCUMENTS

| 2004/0175949 A1* | 9/2004 | Lee et al. ............. 438/691 |
| 2010/0003897 A1* | 1/2010 | Kim et al. ............. 451/41 |
| 2011/0045745 A1* | 2/2011 | De Messemaeker et al. ... 451/41 |

FOREIGN PATENT DOCUMENTS

| EP | 0 444 470 A1 * | 9/1991 | ............ B01J 23/10 |
| JP | 63-27389 | 6/1988 | |
| JP | 4-214026 | 8/1992 | |
| JP | 2003-027044 | 1/2003 | |
| JP | 2003-238943 | 8/2003 | |
| JP | 2005-68312 | 3/2005 | |
| JP | 2006-273994 | 10/2006 | |
| JP | 2007-31261 | 2/2007 | |
| JP | 2010-155931 | 7/2010 | |

* cited by examiner

Primary Examiner — Pegah Parvini
(74) Attorney, Agent, or Firm — Cozen O'Connor

(57) ABSTRACT

Provided are fine abrasive particles which have a high rate of polishing and generate few polishing flaws. A process for producing then abrasive particles is also provided in which the fine abrasive particles have a reduced coefficient of fluctuation in particle diameter, the production steps are simple, and the production cost is low. The fine abrasive particles comprise cerium oxide, at least one element selected from La, Pr, Nd, Sm, and Eu, and one or more element selected from Y, Gd, Tb, Dy, Ho, Er, Tm, Yb, and Lu, and are characterized in that the cerium oxide has a Ce content of 20 mol % or higher and that the sum (mol %) of the content of the at least one element selected from La, Pr, Nd, Sm, Nd Eu and the content of Ce in the cerium oxide is greater than the sum (mol %) of the contents of the one or more elements selected from Y, Gd, Tb, Dy, Ho, Er, Tm, Yb, and Lu.

6 Claims, 1 Drawing Sheet

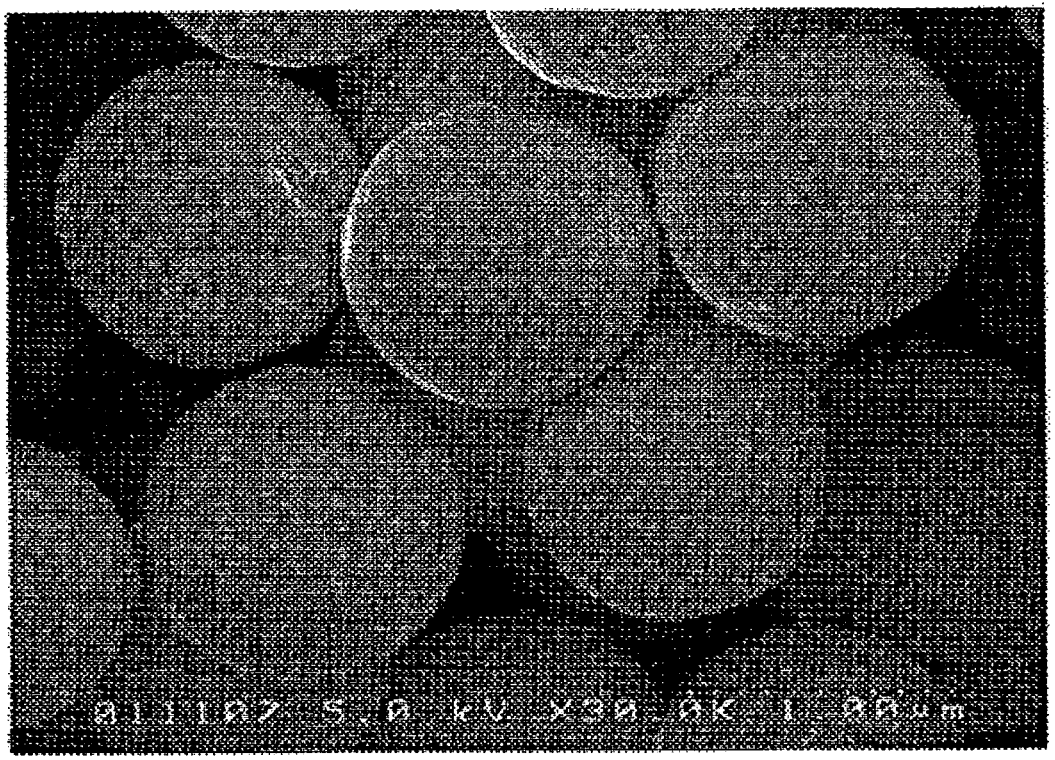

FINE ABRASIVE PARTICLES AND METHOD FOR PRODUCING SAME

RELATED APPLICATIONS

This is a U.S. national stage of International application No. PCT/JP2011/073194 filed on Oct. 7, 2011.

This application claims the priority of Japanese application no. 2011-012695 filed Jan. 25, 2011, the entire content of which is hereby incorporated by reference.

TECHNICAL FIELD

The present invention relates to fine abrasive particles and a method for producing the fine abrasive particles.

BACKGROUND ART

Fine cerium oxide particles are mainly used as catalyst carriers and abrasives for polishing glass, and are required to have largely different characteristics depending on these respective applications.

When used as catalyst carriers, fine cerium oxide particles are required to have a high specific surface area, large pore volume and pores having large diameters, and further required to maintain these values to the utmost extent at high temperature. For example, Japanese Examined Patent Application Publication No. Hei03-24478 discloses cerium(IV) oxide having a specific surface area of $85\pm5$ $m^2/g$ or more after calcinated at 350 to 450° C., and preferably 100 to 130 $m^2/g$ after calcinated at 400 to 450° C. This oxide is prepared by an aqueous solution of cerium(IV) nitrate being hydrolyzed in nitric acid, the resulting precipitates being separated, washed and optionally dried, followed by calcination at 300 to 600° C.

Japanese Examined Patent Application Publication No. Hei03-24411 discloses cerium(IV) oxide having a specific surface area of $85\pm5$ $m^2/g$ or more after calcinated at 350 to 500° C., and preferably 150 to 180 $m^2/g$ after calcinated at 400 to 450° C. This oxide is prepared by an aqueous solution of cerium(IV) nitrate being reacted with an aqueous solution containing sulfate ions to precipitate basic cerium(IV) sulfate, and the resulting precipitates being separated, washed and optionally dried, followed by calcination at 300 to 500° C.

Japanese Patent Application Laid-open Publication No. Sho62-275021 discloses an intermediate compound for producing fine cerium oxide such as the above and a method for producing the intermediate compound. The intermediate compound is a cerium(IV) compound represented by a general formula $Ce(OH)_x(NO_3)_y \cdot p(cerium\ oxide) \cdot n(H_2O)$ wherein in the formula, x represents a value satisfying x=4−y, y represents a value from 0.35 to 1.5, p represents a value from 0 to 2.0, and n represents a value from 0 to about 20. This method for producing the cerium(IV) compound is composed of hydrolyzing an aqueous solution of cerium(IV) salt with an acid media, separating and optionally heating the resulting precipitates. The shape of this intermediate compound is the same as that of cerium oxide when observed by X-ray diffraction, but the intermediate compound is lost in calcination by 20%. After the intermediate compound is calcinated, cerium oxide having a large specific surface area is obtained.

Cerium oxide powders obtained by the above methods each has a very small crystal particle size of around 5 Å (0.5 nm) when obtained by X-ray diffraction and a large specific surface area of $85\pm5$ $m^2/g$ or more, and normally 100 $m^2/g$ or more. Sizes of the fine particles are around 0.5 to 2 μm, and the fine particles have fine pores having sizes of around 50 Å.

As an abrasive for polishing glass in a finishing process, cerium oxide is commonly known to be the most effectual and thus widely used. In polishing glass such as a lens, a cerium oxide abrasive obtained by calcinating and grinding bastnasite containing cerium oxide as a main component is generally used. However, such a cerium oxide abrasive used in practice has an average particle size of 1 to 3 μm. In addition, such a cerium oxide abrasive inevitably contains impurities and the content of impurities is uncontrollable because natural ore is used as a starting material. Thus, such a cerium oxide abrasive is unsuitable for use in manufacturing a semiconductor device.

As a method for producing highly pure cerium oxide, there is a method for producing cerium oxide by adding a salt of, for example, carboxylic acid, oxalic acid or acetic acid to an aqueous solution of refined cerium(III) nitrate, cerium(III) chloride or cerium(III) sulfate to precipitate cerium(III) carbonate, cerium(III) oxalate or cerium(III) acetate, filtrating the resulting precipitates, drying the precipitates, and calcinating the precipitates. Cerium(III) oxide is unstable and thus cannot be present in the air; therefore, all of the cerium oxide is present as cerium (quadrivalent) dioxide. In the calcinations in the above producing methods, carboxylic acid, oxalic acid or acetic acid vaporize from the dried precipitates as temperature rises, and cerium oxide is produced. Portions from which carboxylic acid, oxalic acid or acetic acid has been vaporized are present as holes, and thus produced fine particles have very poor crystallinity. Cerium oxide with poor crystallinity has high chemical reactivity and thus causes problems such as burning, "orange peel" and adherence on the surface to be polished when used as an abrasive. Therefore, cerium oxide with poor crystallinity is unsuitable for use in fine polishing, and calcinating temperature needs to be higher. Higher calcinating temperature provides smaller pores and higher crystallinity, while enhancing sintering and producing larger particles. Even if particle sizes are large, fine cerium oxide particles can be obtained by grinding. If a particle size distribution does not need to be considered, it is possible to obtain an average particle size of 0.02 to 2.0 μm by grinding, and thus such grinded cerium oxide may be used in manufacturing a semiconductor device depending on its purpose of use. When fineness of a polished surface is strictly required, particle sizes are required to be similar; however, grinding cannot form fine particles having similar particle sizes.

Patent document 1 proposes, to provide particles having similar sizes, a manufacturing method composed of steps of simultaneously and continuously mixing an aqueous solution of cerium nitrate with an aqueous solution of ammonium so that an equivalent number of ammonium is bigger than that of cerium and pH of a media under reaction is 6 or more, collecting the obtained precipitates by filtration, drying the precipitates, calcinating the precipitates at 600 to 1200° C., and grinding the obtained oxide with a jet mill. Patent document 1 describes that in the case of using cerium(III) nitrate, hydrogen peroxide solution is added so as to change cerium(III) nitrate into cerium(IV) nitrate, and 0.5 to 60% solution of a salt of one or more types of tridentate rare-earth elements selected from a group including lanthanides and yttrium is essentially used. The obtained oxide has an average particle size of 0.5 to 1.7 μm. Thus, this obtained oxide is also unsuitable for use in the case where fineness of a polished surface is strictly required.

As disclosed in Patent document 2, there is a known method for producing a cerium-based abrasive such as the above, the method including steps of mixing a rare-earth element compound containing a rare-earth salt with ammonium hydrogen carbonate in the amount exceeding a stoichiometric ratio for reaction with the rare-earth salt in the water followed by heating, and calcinating the formed and precipitated rare-earth hydroxycarbonate. The above method can produce the cerium-based abrasive which can achieve high polishing speed to some extent, but this cerium-based abrasive is not sufficient as to polishing fineness.

As disclosed in Patent document 3, there is a method for producing a core-shell type monodisperse spherical cerium-polymer hybrid nanoparticle, the method including steps of mixing a cerium salt with polymer in an organic solvent having a high boiling point to obtain a mixture (mixing step) and precipitating cerium oxide by heating the mixture at reflux at 110° C. or higher (heating and refluxing step), and the method characterized by including a step of causing boiling in the heating and refluxing step and a step of rapidly cooling after the heating and refluxing step. This method requires the step of heating and boiling and the step of rapid cooling, and thus complex producing processes and high producing cost are required.

As disclosed in Patent document 4, there is a known cerium oxide compound containing cerium oxide and an element having an ion radius larger than the ion radius of cerium(IV). The cerium oxide compound produced by methods described in Examples 1 and 2 of Patent document 4 can achieve high polishing speed to some extent, but this cerium oxide compound is not sufficient as to polishing fineness.

As disclosed in Patent document 5, there is a known method for producing an intermediate compound of a cerium-based abrasive, the method characterized by including steps of mixing an aqueous solution of at least one type of carbonic acid-based precipitant selected from a group including alkali metal carbonates, alkali metal hydrogen carbonates, ammonium carbonate and ammonium hydrogen carbonate with an aqueous solution of rare-earth compound having $CeO_2$/TREO (total rare earth oxides) of 30% by mass or more so that the carbonic acid-based precipitant is excess as to a stoichiometric amount to thereby form precipitates, and heating the mixture to 60° C. or more without solid-liquid separation. A cerium oxide abrasive produced by the method of Patent document 5 can achieve high polishing speed to some extent, but this cerium oxide abrasive is not sufficient as to polishing fineness.

In a field of ceramic, size and specific surface area of fine particles often correspond with each other by the following equation.

Specific surface area $(m^2/g) = 3/r\rho$

In the equation, r represents diameter (μm) and ρ represents density (g/ml).

In the case of using a material having a large number of pores, the relationship between particle size and specific surface area does not satisfy the above equation. Cerium oxide obtained by the producing methods developed for the case of using cerium oxide as catalyst carriers has a large specific surface area; thus, if corresponding particle size obtained from the above equation is small, namely, 5 nm or less, corresponding particle size is actually around 1 μm.

As for an abrasive, requirements concerning particle size vary according to its applications. When higher fineness finished surface after polishing is desired, an abrasive is required to be finer particles. For use in manufacturing a semiconductor device, particle sizes are required to be 0.02 to 2.0 μm and also required to be similar. For example, in the case of polishing an insulating interlayer in manufacturing a semiconductor device, a polished surface is required to be fine to have an average surface roughness of around 5 Å (0.5 nm); thus, particle sizes must be 2.0 μm or less to meet the requirement. Meanwhile, smaller particles tend to cause lower polishing speed. Thus, particle sizes of less than 20 nm detract the advantage that cerium oxide provides higher polishing speed compared to colloidal silica. Further, to achieve flatness, particle sizes are required to be as similar as possible. Thus, an average particle size is required to be 0.02 to 2.0 μm, and also particle sizes are required to be similar. Moreover, to achieve flatness, shapes of fine particles are required to be as similar as possible. If each fine particle is formed of a single crystal, respective fine particles have almost the same shapes, and thus highly fine flatness can be achieved.

In polishing silicon oxide such as quartz substrates, it is known that cerium oxide achieves the highest polishing speed. In addition, because an insulating interlayer is composed of silicon oxide, to achieve high speed of polishing an insulating interlayer, cerium oxide is the most suitable. However, as to an insulating interlayer, requirements for flatness and fineness of a polished surface are very strict. At present, only fine particles of colloidal silica have a small particle size distribution and particle sizes of 0.02 to 2.0 μm, and thus colloidal silica is used; however, colloidal silica causes insufficient polishing speed. Hence, cerium oxide having a small particle size distribution and an average particle size of 0.02 to 2.0 μm has been eagerly desired.

PRIOR ART DOCUMENT

Patent Document

Patent document 1: Japanese Patent Application Laid-open Publication No. Sho63-27389
Patent document 2: Japanese Patent Application Laid-open Publication No. 2003-238943
Patent document 3: Japanese Patent Application Laid-open Publication No. 2010-155931
Patent document 4: Japanese Patent Application Laid-open Publication No. 2007-031261
Patent document 5: Japanese Patent Application Laid-open Publication No. 2006-273994

SUMMARY OF THE INVENTION

Problems to be Solved by the Invention

The present invention is made considering the above problems. An object of the present invention is to provide fine abrasive particles providing high polishing speed and causing less polishing scratches and a method for producing fine abrasive particles, the method achieving a small coefficient of variation of particle sizes and requiring simple producing steps and low production cost.

Means for Solving Problems

The above object of the present invention is accomplished by the following configurations.

1. Fine abrasive particles including cerium oxide, at least one type of element selected from the group consisting of La, Pr, Nd, Sm and Eu, and at least one type of element selected from the group consisting of Y, Gd, Tb, Dy, Ho, Er, Tm, Yb and Lu, wherein:
a content of Ce of the cerium oxide is 20 mol % or more; and a sum of a content (mol %) of the at least one type of element selected from the group consisting of La, Pr, Nd, Sm and Eu and the content of Ce of the cerium oxide is larger than a sum of a content (mol %) of the at least one type of element selected from the group consisting of Y, Gd, Tb, Dy, Ho, Er, Tm, Yb and Lu.

2. The fine abrasive particles of the above 1, wherein the content of Ce of the cerium oxide ranges from 40 to 70 mol %.

3. The fine abrasive particles of the above 1 or 2, wherein the sum of the content (mol %) of the at least one type of element selected from the group consisting of Y, Gd, Tb, Dy, Ho, Er, Tm, Yb and Lu ranges from 5 to 10 mol %.

4. The fine abrasive particles of any one of the above 1 to 3, wherein the sum of the content (mol %) of the at least one type of element selected from the group consisting of La, Pr, Nd, Sm and Eu is 5 mol % or more.

5. The fine abrasive particles of any one of the above 1 to 4, wherein an average size of the fine abrasive particles ranges from 0.02 to 2.0 μm.

6. The fine abrasive particles of any one of the above 1 to 5, wherein a coefficient of variation of a particle size distribution of the fine abrasive particles is 20% or less.

7. The fine abrasive particles of any one of the above 1 to 6, wherein the fine abrasive particles are spherical.

8. A method for producing the fine abrasive particles of any one of the above 1 to 7, the method including:

forming cerium basic carbonate by adding an urea compound to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu; and calcinating the formed cerium basic carbonate in the air or under oxidizing atmosphere.

9. A method for producing the fine abrasive particles of any one of the above 1 to 7, the method including:

forming cerium basic carbonate by adding hydrogen peroxide and an urea compound to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu; and calcinating the formed cerium basic carbonate in the air or under oxidizing atmosphere.

Effects of the Invention

The present invention can provide fine abrasive particles providing high polishing speed and causing less polishing scratches, and a method for producing fine abrasive particles, the method achieving a small coefficient of variation of particle sizes and requiring simple producing steps and low production cost.

BRIEF DESCRIPTION OF THE DRAWING

The drawing shows an example of a scanning electron micrograph of fine abrasive particles of the present invention.

EMBODIMENTS FOR CARRYING OUT THE INVENTION

The present inventors have eagerly studied for solving the above problems and have found that fine abrasive particles that include cerium oxide, at least one type of element selected from the group consisting of La, Pr, Nd, Sm and Eu, and at least one type of element selected from the group consisting of Y, Gd, Tb, Dy, Ho, Er, Tm, Yb and Lu, wherein a content of Ce of the cerium oxide is 20 mol % or more, and the sum of a content (mol %) of the at least one type of element selected from the group consisting of La, Pr, Nd, Sm and Eu and the content of Ce of the cerium oxide is larger than the sum of a content (mol %) of the at least one type of element selected from the group consisting of Y, Gd, Tb, Dy, Ho, Er, Tm, Yb and Lu are provided as fine abrasive particles providing high polishing speed and causing less polishing scratches. The fine abrasive particles also achieve the method for producing fine abrasive particles, the method achieving a small coefficient of variation of particle sizes and requiring simple producing steps and low production cost. The present invention has been thus made.

Hereinafter, the present invention will be described in detail.

Fine abrasive particles of the present invention include cerium oxide, at least one type of element selected from the group consisting of La, Pr, Nd, Sm and Eu, and at least one type of element selected from the group consisting of Y, Gd, Tb, Dy, Ho, Er, Tm, Yb and Lu, wherein a content of Ce of the cerium oxide is 20 mol % or more, and the sum of a content (mol %) of the at least one type of element selected from the group consisting of La, Pr, Nd, Sm and Eu and the content of Ce of the cerium oxide is larger than the sum of a content (mol %) of the at least one type of element selected from the group consisting of Y, Gd, Tb, Dy, Ho, Er, Tm, Yb and Lu.

In addition to cerium oxide, at least one type of element selected from the group consisting of La, Pr, Nd, Sm and Eu, and at least one type of element selected from the group consisting of Y, Gd, Tb, Dy, Ho, Er, Tm, Yb and Lu are contained. Thus, shapes of the fine abrasive particles can be controlled, and the coefficient of variation of particle sizes can be decreased.

When polishing with fine abrasive particles is conducted, fine abrasive particles may remain as residual foreign materials after polishing. In contrast, the present invention can reduce residual abrasive particles after polishing by defining a content of Ce of cerium oxide to be 20 mol % or more.

In terms of achieving high polishing speed and reducing residual foreign matters after polishing, the following configurations (1) to (4) are preferable.

(1) a content of Ce of cerium oxide ranges preferably from 20 to 80%, and more preferably from 40 to 70%

(2) the sum of a content of at least one element selected from Y, Gd, Tb, Dy, Ho, Er, Tm, Yb and Lu is preferably 5 mol or more, and more preferably from 5 to 10 mol %

(3) the sum of a content of at least one element selected from La, Pr, Nd, Sm and Eu is preferably 5 mol % or more (4) the distribution of sizes of the fine abrasive particles is preferably monodisperse, and the coefficient of variation of particle size distribution is preferably 20% or less (Average Particle Size and Coefficient of Variation of Abrasive Particles)

In an abrasive, requirements concerning particle size vary according to its applications. When higher fineness of finished surface after polishing is desired, fine abrasive particles are required to be finer. For use in manufacturing a semiconductor device, an average particle size is required to be 2.0 μm or less. Meanwhile, smaller particles tend to cause lower polishing speed. Thus, particle sizes of less than 0.02 μm detract the advantage that cerium oxide provides higher polishing speed compared to colloidal silica.

Therefore, an average size of the abrasive particles ranges preferably from 0.02 to 2.0 μm, and more preferably from 0.05 to 1.5 μm.

Crystallite size of the fine abrasive particle ranges preferably from 10 to 100 nm. Crystallite size is calculated using "Wilson method" measuring 10 to 15 peaks selected from measurable diffraction peaks obtained by X-ray diffraction.

To achieve flatness, it is required that particle sizes are as similar as possible, i.e., the coefficient of variation of particle size distribution is as small as possible. Thus, particle sizes are required not only to be 0.02 to 2.0 μm but also to be similar. If each particle is formed of a single crystal, respective particles have almost the same shapes, and thus highly fine flatness is achieved.

The average size and the coefficient of variation of particle size distribution of the fine abrasive particles can be obtained by measuring the water dispersing the abrasive particles therein with a surfactant using a particle size measuring device of light scattering method (for example, LA-910 from HORIBA, Ltd.). The coefficient of variation can also be obtained with an average and standard deviation of particle sizes of a large number of abrasive particles, the particle sizes obtained with electron microgram(s) using a scanning electron microscope (SEM), a transmission electron microscope (TEM) or the like. The average and standard deviation of sizes of particles in a liquid may be obtained by dynamic light scattering method; however, this method is based on some assumptions. Thus, the coefficient of variation obtained based on dynamic light scattering method is less reliable than the coefficient of variation directly obtained with scanning electron microgram(s).

(Shape of Fine Abrasive Particle)

The fine abrasive particle of the present invention may be formed of a single crystal or may be an aggregation of multiple fine particles. The fine abrasive particle of the present invention may be in any shape, for example, may be a flat plate, polyhedron, sphere or the like. To increase frequency of contact between fine abrasive particles and objects to be polished in polishing, spherical fine particles are preferable. Spherical fine particles do not need to be an aggregation of spherical crystals; the present invention also includes the case where fine particles whose shapes are other than sphere are aggregated to consequently form spherical fine particles.

The definition of "spherical" herein is that a ratio of a longer diameter (a) of a spherical particle to a shorter diameter (b) of the spherical particle, (a)/(b), ranges from 1.00 to 1.02, the longer diameter (a) and the shorter diameter (b) obtained with microgram (s) taken with a scanning electron microscope (SEM) or transmission electron microscope (TEM).

Spherical fine abrasive particles can be obtained by calcinating basic carbonate of the above-described rare-earth element in the air or under oxidizing atmosphere (in oxygen) while maintaining the shape of the basic carbonate. Temperature in the calcination is preferably 500° C. or more.

[Method for Producing Fine Abrasive Particle]

The present invention provides monodispersed fine abrasive particles composed of an inorganic compound including 20 mol % Ce of cerium oxide, the inorganic compound produced through a method for producing the fine abrasive particles, the method characterized by including steps of forming cerium basic carbonate by adding an urea compound or adding an urea compound and hydrogen peroxide to an aqueous solution containing the Ce, and calcinating the formed cerium basic carbonate in the air or under oxidizing atmosphere.

To heighten polishing speed of abrasive particles, the present inventors also reveal that it is necessary to control the valence of Ce through producing cerium oxide by controlling atmosphere in the calcination.

Next, a method for producing the fine abrasive particles of the present invention is specifically described.

The fine abrasive particles of the present invention can be produced by the following producing method 1 or 2.

(Producing Method 1)

An urea compound is added to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu to precipitate cerium basic carbonate, and then the obtained precipitates are separated by solid-liquid separation. Thereafter, the obtained cerium basic carbonate is calcinated in the air or under oxidizing atmosphere.

(Producing Method 2)

An urea compound and hydrogen peroxide are added to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu to precipitate cerium basic carbonate, and then the obtained precipitates are separated by solid-liquid separation. Thereafter, the obtained cerium basic carbonate is calcinated in the air or under oxidizing atmosphere.

In the above methods, a cerium salt, a salt of at least one type of element selected from the group consisting of La, Pr, Nd, Sm and Eu and a salt of at least one type of element selected from the group consisting of Y, Gd, Tb, Dy, Ho, Er, Tm, Yb and Lu are preferably nitrates. As for a cerium salt, cerium(III) nitrate, cerium(III) chloride, cerium(III) sulfate and the like can be given as examples. Among these examples, cerium(III) nitrate is preferable.

Examples of the urea compound include urea, urea salts (nitrates and chlorides, for example), N,N'-diacetylurea, N,N'-dibenzoylurea, N,N-dibenzoylurea, benzene sulfonyl urea, p-toluene sulfonyl urea, trimethyl urea, tetraethyl urea, tetramethyl urea, triphenyl urea, tetraphenyl urea, N-benzoyl urea, methyl isourea, ethyl isourea and the like, and urea is preferable. The amount of the urea compound to be added is preferably 3 to 5 times as much as that of the above rare-earth elements.

Cerium(III) oxide is unstable and thus preferably changed into cerium(IV) oxide using hydrogen peroxide. In the case of using hydrogen peroxide, the amount thereof to be added ranges preferably from 1/100 to 30/100 with respect to the total ion concentration of the above rare-earth elements.

EXAMPLES

Hereinafter, the present invention is specifically described with reference to examples, but the present invention is not limited thereto. In examples, "part(s)" and "%" mean "part(s) by mass" and "%, by mass", respectively, unless described otherwise.

Example 1

Preparation of Fine Abrasive Particle (Preparation of Fine Abrasive Particle 1)

10 liters of an aqueous solution containing yttrium nitrate, cerium nitrate and lanthanum nitrate where the total concentration of these nitrates is 0.05 mol/L and a ratio (molar ratio) of contents of ions of these nitrates in the aqueous solution is 20/70/10 was heated to 95° C. To this aqueous solution, hydrogen peroxide was added to obtain a hydrogen peroxide concentration of 0.01 mol/L and urea was added to obtain an urea concentration of 0.6 mol/L, followed by heating at 95° C.

for an hour. Basic carbonate including yttrium/cerium/lanthanum in the ratio of 20 mol %/70 mol %/10 mol % was thus prepared.

The precipitated basic carbonate is separated using a membrane filter, and then calcinated at 700° C. for 2 hours. Fine abrasive particles 1 of the present invention were thus obtained.

(Preparations of Fine Abrasive Particles 2 to 15)

Fine abrasive particles 2 to 15 were prepared by the same way as the fine abrasive particles 1 was prepared except that respective ratios of concentrations of yttrium nitrate, cerium nitrate, lanthanum nitrate and praseodymium nitrate were as shown in Table 1.

<<Measurement and Evaluation of Fine Abrasive Particles>>

The obtained fine abrasive particles were subjected to evaluations as to element assay, average particle sizes, coefficients of variations of particle size distributions, polishing speeds, occurrence of scratches and occurrence of micro scratches by the following methods.

(Element Assay)

The fine abrasive particles were subjected to quantitative assay with an inductively coupled plasma mass spectrometer (ICP-MS). The device used herein was SPQ9700 from SII Nanotechnologies Inc. Results of the element assay show that a ratio of the loaded nitrates (mol %) almost corresponds to a ratio of the elements in the fine abrasive particles (mol %) within a range of measurement deviation.

(Average Particle Size and Coefficient of Variation of Particle Size Distribution)

Averages of particle sizes and coefficients of variations of particle sizes were obtained with SEM images including about 100 fine abrasive particles (fine abrasive particles 1).

(Polishing Speed)

An polishing device used herein was a device polishing surfaces to be polished with a polishing pad under supply of slurry of fine abrasive particles to the surfaces to be polished. A concentration of the fine abrasive particles in the slurry of the fine abrasive particles was 100 g/L (a used dispersant was composed of water only). In the polishing test, the slurry of the fine abrasive particles was supplied at a rate of 5 L/min, and the fine abrasive particles were cyclically used. An object to be polished was glass for a flat panel of 65 mmΦ. The polishing pad was made from polyurethane. The polishing was conducted for 30 minutes under the conditions that pressure of the polishing pad applied against the surface to be polished was 9.8 kPa (100 g/cm$^2$) and rotation speed of the polishing test device was 100 min$^{-1}$ (rpm). Thicknesses of the glass before and after the polishing were measured with Nikon Digimicro (MF501), and polishing amounts per minute were obtained with differences between the thicknesses and were determined as polishing speeds.

(Scratches)

Presence of scratches of 50 to 100 μm was examined for 100 glasses for flat panel by visual estimation.

(Micro Scratches)

For 100 glasses where no scratch was observed in the above visual estimation, micro scratches of a few μm were counted with MicroMAX VMX-2200 from Scitex Vision.

Results of the evaluations are shown in Table 1.

TABLE 1

| Fine abrasive particle | Content (mol%) | | | | Average particle size | Particle size variation coefficient | Polishing speed | Scratches (visual | Micro scrathes (number/ | |
|---|---|---|---|---|---|---|---|---|---|---|
| No. | Y | Ce | La | Pr | (μm) | (%) | (μm/min) | estimation) | 100 plate) | Note |
| 1 | 20 | 70 | 10 | 0 | 0.5 | 14.5 | 0.7 | not observed | 2 | Present invention |
| 2 | 10 | 70 | 20 | 0 | 0.5 | 4.3 | 0.9 | not observed | 1 | Present invention |
| 3 | 5 | 70 | 25 | 0 | 0.5 | 6.7 | 0.9 | not observed | 1 | Present invention |
| 4 | 1 | 70 | 29 | 0 | 0.5 | 19.8 | 0.6 | not observed | 3 | Present invention |
| 5 | 20 | 80 | 0 | 0 | 0.5 | 31.3 | 0.4 | not observed | 10 | Comparative example |
| 6 | 10 | 80 | 10 | 0 | 0.5 | 18.8 | 0.7 | not observed | 4 | Present invention |
| 7 | 5 | 80 | 15 | 0 | 0.5 | 14.5 | 0.8 | not observed | 4 | Present invention |
| 8 | 10 | 40 | 50 | 0 | 1.0 | 17.3 | 1.0 | not observed | 7 | Present invention |
| 9 | 5 | 40 | 55 | 0 | 1.0 | 13.0 | 1.0 | not observed | 7 | Present invention |
| 10 | 20 | 20 | 60 | 0 | 1.6 | 24.0 | 1.1 | not observed | 12 | Present invention |
| 11 | 20 | 10 | 70 | 0 | 2.4 | 25.5 | 0.12 | observed | not observed | Comparative example |
| 12 | 0 | 70 | 30 | 0 | 0.5 | 28.0 | 0.4 | not observed | 3 | Comparative example |
| 13 | 55 | 40 | 5 | 0 | 1.3 | 31.7 | 0.4 | not observed | 10 | Comparative example |
| 14 | 10 | 70 | 10 | 10 | 0.5 | 8.9 | 0.9 | not observed | 7 | Present invention |
| 15 | 5 | 90 | 5 | 0 | 0.3 | 20.3 | 0.5 | not observed | 5 | Present invention |

Table 1 demonstrates that the fine abrasive particles of the present invention have smaller coefficients of variations of particle sizes, provide higher polishing speeds and cause less polishing scratches compared to the comparative examples.

INDUSTRIAL APPLICABILITY

The fine abrasive particles of the present invention and the method for producing the fine abrasive particles of the present invention is applicable to a field of polishing with an abrasive fine particles containing cerium oxide.

The invention claimed is:

1. Fine abrasive particles comprising cerium oxide, at least one type of element selected from the group consisting of La, Pr, Nd, Sm and Eu, and at least one type of element selected from the group consisting of Y, Gd, Tb, Dy, Ho, Er, Tm, Yb and Lu, wherein:

a content of Ce of the cerium oxide in the fine abrasive particles is 20 mol % or more;

a sum of a content (mol %) of the at least one type of element selected from the group consisting of La, Pr, Nd, Sm and Eu in the fine abrasive particles and the content of Ce of the cerium oxide is larger than a sum of a content (mol %) of the at least one type of element selected from the group consisting of Y, Gd, Tb, Dy, Ho, Er, Tm, Yb and Lu in the fine abrasive particles;

the sum of the content (mol %) of the at least one type of element selected from the group consisting of Y, Gd, Tb, Dy, Ho, Er, Tm, Yb and Lu is 1 mol % or more;

the sum of the content (mol %) of the at least one type of element selected from the group consisting of La, Pr, Nd, Sm and Eu is 5 mol % or more;

an average size of the fine abrasive particles ranges from 0.02 to 2.0 µm; and the fine abrasive particles are spherical.

2. The fine abrasive particles of claim 1, wherein the content of Ce of the cerium oxide ranges from 40 to 70 mol %.

3. The fine abrasive particles of claim 1, wherein the sum of the content (mol %) of the at least one type of element selected from the group consisting of Y, Gd, Tb, Dy, Ho, Er, Tm, Yb and Lu ranges from 5 to 10 mol %.

4. The fine abrasive particles of claim 1, wherein a coefficient of variation of a particle size distribution of the fine abrasive particles is 20% or less.

5. A method for producing the fine abrasive particles of claim 1, the method comprising:

forming cerium basic carbonate by adding an urea compound to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu; and calcinating the formed cerium basic carbonate in the air or under oxidizing atmosphere.

6. A method for producing the fine abrasive particles of claim 1, the method comprising:

forming cerium basic carbonate by adding hydrogen peroxide and an urea compound to an aqueous solution containing a cerium salt, a salt of at least one type of element selected from the group consisting of La, Pr, Nd, Sm and Eu, and a salt of at least one type of element selected from the group consisting of Y, Gd, Tb, Dy, Ho, Er, Tm, Yb and Lu; and calcinating the formed cerium basic carbonate in the air or under oxidizing atmosphere.

* * * * *